(12) United States Patent
Baer et al.

(10) Patent No.: US 9,724,900 B2
(45) Date of Patent: *Aug. 8, 2017

(54) GAS SEPARATION MEMBRANE

(71) Applicants: Case Western Reserve University, Cleveland, OH (US); The University of Texas at Austin, Austin, TX (US)

(72) Inventors: Eric Baer, Cleveland Heights, OH (US); Shannon Armstrong, Cleveland Heights, OH (US); Benny D. Freeman, Austin, TX (US); Donald R. Paul, Austin, TX (US); Grant Offord, Austin, TX (US)

(73) Assignees: Case Western Reserve University, Cleveland, OH (US); The University of Texas at Austin, Austin, TX (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/570,990

(22) Filed: Dec. 15, 2014

(65) Prior Publication Data

US 2015/0298436 A1    Oct. 22, 2015

Related U.S. Application Data

(63) Continuation of application No. 13/875,113, filed on May 1, 2013, now Pat. No. 8,911,540.
(Continued)

(51) Int. Cl.
*B01D 53/22* (2006.01)
*B32B 27/08* (2006.01)
(Continued)

(52) U.S. Cl.
CPC ............ *B32B 27/08* (2013.01); *B01D 53/228* (2013.01); *B01D 67/0027* (2013.01);
(Continued)

(58) Field of Classification Search
CPC ........ B29K 2077/00; B29K 2995/0065; B29K 2023/12; B29L 2009/00; B29L 2031/712; B29L 2031/755; B32B 27/32; B32B 27/34; B32B 2250/24; B32B 2307/724; B32B 2553/00; B01D 69/12; B01D 69/148; B01D 71/44; B01D 71/80; B01D 71/02;
(Continued)

(56) References Cited

U.S. PATENT DOCUMENTS 4,138,459 A    2/1979  Brazinsky et al.
4,717,618 A    1/1988  Tse et al.
(Continued)

OTHER PUBLICATIONS

Stern, S.A., "The "Barrer" Permeability Unit", Journal of Polymer Science: Part A-2, vol. 6, Apr. 5, 1968, pp. 1933-1934.

*Primary Examiner* — Anthony Shumate
(74) *Attorney, Agent, or Firm* — Tarolli, Sundheim, Covell & Tummino LLP

(57) ABSTRACT

A method of fabricating a gas separation membrane includes providing a coextruded multilayer film that includes a first polymer layer formed of a first polymer material and a second polymer layer formed of a second polymer material, the first polymer material having a first gas permeability. The coextruded multilayer film is axially oriented such that the second polymer layer has a second gas permeability that is greater than the first gas permeability.

22 Claims, 16 Drawing Sheets

Related U.S. Application Data

(60) Provisional application No. 61/640,758, filed on May 1, 2012.

(51) Int. Cl.

| | | |
|---|---|---|
| *B01D 67/00* | (2006.01) | |
| *B01D 71/44* | (2006.01) | |
| *B01D 69/02* | (2006.01) | |
| *B01D 69/12* | (2006.01) | |
| *B01D 69/14* | (2006.01) | |
| *B01D 71/80* | (2006.01) | |
| *B29C 47/00* | (2006.01) | |
| *B29C 47/06* | (2006.01) | |
| *B29C 47/78* | (2006.01) | |
| *B32B 27/32* | (2006.01) | |
| *B32B 27/34* | (2006.01) | |
| *B29C 47/88* | (2006.01) | |
| *B29C 47/90* | (2006.01) | |
| *B01D 71/56* | (2006.01) | |
| *B01D 71/02* | (2006.01) | |
| *B01D 71/26* | (2006.01) | |
| *B01D 71/48* | (2006.01) | |
| *B29K 23/00* | (2006.01) | |
| *B29K 77/00* | (2006.01) | |
| *B29L 9/00* | (2006.01) | |
| *B29L 31/00* | (2006.01) | |

(52) U.S. Cl.
CPC ............ *B01D 69/02* (2013.01); *B01D 69/12* (2013.01); *B01D 69/148* (2013.01); *B01D 71/44* (2013.01); *B01D 71/80* (2013.01); *B29C 47/0007* (2013.01); *B29C 47/0021* (2013.01); *B29C 47/06* (2013.01); *B29C 47/78* (2013.01); *B29C 47/8805* (2013.01); *B29C 47/90* (2013.01); *B32B 27/32* (2013.01); *B32B 27/34* (2013.01); *B01D 71/02* (2013.01); *B01D 71/26* (2013.01); *B01D 71/48* (2013.01); *B01D 71/56* (2013.01); *B01D 2325/04* (2013.01); *B01D 2325/20* (2013.01); *B29C 47/904* (2013.01); *B29K 2023/12* (2013.01); *B29K 2077/00* (2013.01); *B29K 2995/0065* (2013.01); *B29L 2009/00* (2013.01); *B29L 2031/712* (2013.01); *B29L 2031/755* (2013.01); *B32B 2250/24* (2013.01); *B32B 2307/724* (2013.01); *B32B 2553/00* (2013.01)

(58) Field of Classification Search
CPC ........ B01D 71/26; B01D 71/48; B01D 71/56; B01D 2325/04; B01D 2325/20; B29C 47/0007; B29C 47/0021; B29C 47/06; B29C 47/78; B29C 47/8805; B29C 47/90; B29C 47/904

See application file for complete search history.

(56) References Cited

U.S. PATENT DOCUMENTS

| | | |
|---|---|---|
| 5,134,174 A | 7/1992 | Xu et al. |
| 5,215,554 A | 6/1993 | Kramer et al. |
| 5,294,346 A | 3/1994 | Donato et al. |
| 5,837,032 A | 11/1998 | Moll et al. |
| 6,063,417 A * | 5/2000 | Paleari ............ B32B 27/08 426/127 |
| 6,075,179 A | 6/2000 | McCormack et al. |
| 6,114,024 A | 9/2000 | Forte |
| 6,306,491 B1 | 10/2001 | Kram et al. |
| 6,368,742 B2 | 4/2002 | Fisher et al. |
| 8,623,124 B2 | 1/2014 | Hosseini et al. |
| 8,709,640 B2 | 4/2014 | Kikuchi et al. |
| 8,715,849 B2 | 5/2014 | Takita et al. |
| 8,906,539 B2 * | 12/2014 | Takita ............ B32B 27/32 429/144 |
| 8,911,540 B2 * | 12/2014 | Baer ............ B01D 53/228 95/43 |
| 2002/0136945 A1 | 9/2002 | Call et al. |
| 2003/0036577 A1 | 2/2003 | Hughes et al. |
| 2003/0198715 A1 * | 10/2003 | Morris ............ B32B 27/32 426/106 |
| 2005/0202163 A1 | 9/2005 | Nguyen et al. |
| 2006/0105130 A1 * | 5/2006 | Brown ............ B32B 15/08 428/35.7 |
| 2006/0270806 A1 * | 11/2006 | Hale ............ C08J 5/18 525/439 |
| 2007/0275134 A1 * | 11/2007 | Siegel ............ A23B 4/16 426/129 |
| 2008/0095960 A1 * | 4/2008 | Schell ............ B32B 7/10 428/34.8 |
| 2008/0118827 A1 | 5/2008 | Call et al. |
| 2008/0131676 A1 | 6/2008 | Becke et al. |
| 2008/0173179 A1 | 7/2008 | Tandon et al. |
| 2009/0011263 A1 * | 1/2009 | Forloni ............ B32B 27/32 428/483 |
| 2009/0123827 A1 | 5/2009 | Kono et al. |
| 2009/0274856 A1 * | 11/2009 | Chou ............ B32B 15/08 428/35.2 |
| 2010/0003591 A1 | 1/2010 | Takita et al. |
| 2010/0100116 A1 * | 4/2010 | Brister ............ A61F 5/003 606/192 |
| 2010/0295511 A1 | 11/2010 | Kikuchi et al. |
| 2011/0039083 A1 * | 2/2011 | Chen ............ B32B 27/08 428/219 |
| 2011/0192281 A1 | 8/2011 | Hosseini et al. |
| 2011/0241245 A1 * | 10/2011 | Hiltner ............ B29C 47/0007 264/173.15 |
| 2012/0028058 A1 * | 2/2012 | Paolilli ............ B29C 47/0004 428/457 |
| 2012/0191124 A1 * | 7/2012 | Brister ............ A61F 5/0043 606/192 |
| 2012/0328602 A1 | 12/2012 | Salvemini |
| 2014/0072836 A1 | 3/2014 | Mills |

* cited by examiner

WAXS PATTERNS OF PEBAX LAYERS BEFORE AND AFTER ANNEALING

GAS SEPARATION MEMBRANE

RELATED APPLICATIONS

This application claims the benefit of U.S. Provisional Application Ser. No. 61/640,758, filed May 1, 2012, the entirety of which is incorporated herein by reference.

GOVERNMENT FUNDING

This invention was made with government support under Grant Nos. CON500535, and RES501043 awarded by The National Institutes of Health. The United States government has certain rights to the invention.

FIELD OF THE INVENTION

The present invention relates to membranes and, in particular, relates to a thin, coextruded membrane or film with high flux and high selectivity.

BACKGROUND

It is known that polymer and polymer-based membranes may be used in a wide variety of fluid separation processes, such as gas separation, desalination, removal of pathogens or other substances from liquids, such as water, and other applications requiring selective permeation, such as controlled atmosphere food packaging. In gas separations, for example, membranes can be used to separate air into oxygen-rich and nitrogen-rich streams. Gas separation membranes can also be used to remove carbon dioxide and other impurities from natural gas as well as selective removal of hydrogen from a wide variety of process streams important in the chemical, petrochemical, and other industries.

For many applications of membranes, including those mentioned above, the membranes are only commercially viable if they can be made very thin, in many cases on the order of less than about 10 μm or so in thickness. As membranes become thinner, the probability of developing selectivity-destroying pinhole defects in the membrane becomes higher.

Separation membranes can be prepared on large scale from solutions of polymers in a suitable solvent by methods widely known in the art. The polymers used in these applications, including, polysulfones, polyimides, poly(dimethyl siloxanes), polyethers, poly(vinylidene fluoride) and related materials, are typically only soluble in organic solvents. The solvents constitute the dominant mass in membrane processing and must be removed following membrane formation. These solvents, can be flammable and toxic. Additionally, these solvents are expensive not only to purchase but also to dispose of at the end of membrane processing. In many cases, solvent costs, including initial solvent purchases, solvent handling equipment, and solvent disposal equipment and processes are significant costs in the manufacturing of membranes for fluid separations. Therefore, there is a need in the membrane separation field to have methods to prepare membranes via solventless processes.

SUMMARY

Embodiments described herein relate to a gas separation membrane that includes an axially oriented, coextruded multilayer film that has a $CO_2/O_2$ selectivity of at least about 4 and a flux of at least about 20 GPU. The axially oriented, coextruded multilayer film can include at least one axially oriented, coextruded first polymer layer of a first polymer material and at least one axially oriented, coextruded second polymer layer of a second polymer material. The at least one axially oriented, coextruded first polymer layer can have a first gas permeability ($P_1$) prior to axial orientation and a second gas permeability ($P_2$) after axially orientation less than or equal to the first permeability ($P_1$). The at least one axially oriented, coextruded second polymer layer can have a first gas permeability ($P_{1a}$) prior to axial orientation and a second gas permeability ($P_{2a}$) after axial orientation that is substantially greater than first permeability ($P_{1a}$) and the second permeability ($P_2$). In some embodiments, the axially oriented, coextruded multilayer film can include a plurality of axially oriented, coextruded alternating first polymer layers and second polymer layers.

In some embodiments, the axially oriented, coextruded first polymer layer has a first thickness and the combined thicknesses of all the axially oriented, coextruded first polymer layers of the axially oriented, coextruded multilayer film can be less than about 1 μm.

In other embodiments, the at least one axially oriented, coextruded first polymer layer can have a $CO_2/O_2$ selectivity of at least about 4 and a flux of at least about 30 GPU.

In still other embodiments, the first polymer material can be a poly(ether block amide). The poly(ether block amide) can include from about 15% to about 80% of a polyether by molecular weight. The second polymer material can include a polypropylene. The polypropylene can further include $CaCO_3$ or a beta-nucleation agent.

Other embodiments described herein relate to a method of fabricating a gas separation membrane. The method includes coextruding a first polymer material and a second polymer material to form a coextruded multilayer film that includes at least one coextruded first polymer layer and at least one coextruded second polymer layer. The at least one coextruded first polymer layer can have a first permeability ($P_1$) and a $CO_2/O_2$ selectivity of at least about 4. The coextruded multilayer film is then axially oriented to provide an axially oriented, coextruded multilayer film that has a $CO_2/O_2$ selectivity of at least about 4 and a flux of at least about 20 GPU. The at least one axially oriented, coextruded first polymer layer can have a second permeability ($P_2$) after axial orientation that is less than or equal to the first permeability ($P_1$). The at least one axially oriented, coextruded second polymer layer can have a first permeability ($P_{1a}$) prior to axial orientation and a second permeability ($P_{2a}$) after axial orientation that is substantially greater than first permeability ($P_{1a}$) and the second permeability ($P_2$). The method of forming the axially oriented, coextruded multilayer film can be a solventless and/or substantially solventless or a solvent-free process.

In some embodiments, the multilayer film can be axially oriented at a temperature that is below the melting temperature ($T_m$) of the second polymer material. In other embodiments, the axial orientation comprises uniaxial stretching.

In still other embodiments, the axially oriented, coextruded multilayer film can include a plurality of axially oriented, coextruded alternating first polymer layers and second polymer layers. The axially oriented, coextruded first polymer layer can have a first thickness, and the combined thicknesses of all the axially oriented, coextruded first polymer layers of the axially oriented, coextruded multilayer film can be less than about 1 μm.

In some embodiments, the coextruded multilayer film is axially stretched about 100% to about 400%. In other embodiments, the multilayer film is heat treated at a temperature and for a time effective to increase the gas permeability of the at least one axially oriented, coextruded first polymer layer. In still other embodiments, the axially orienting the at least one first polymer layer can cause strain-induced crystallization in the at least one first polymer layer and heat treating the axially oriented coextruded multilayer film at least partially reverses crystallization in the at least one axially oriented coextruded first polymer layer to increase the gas permeability of the at least one axially oriented coextruded first polymer layer.

The multilayer film described herein can be used in a wide range of fluid separation processes, such as gas separation, desalination, removal of pathogens or other substances from liquids, such as water, and other applications requiring selective permeation, such as controlled atmosphere food packaging.

DETAILED DESCRIPTION

Figure 1:
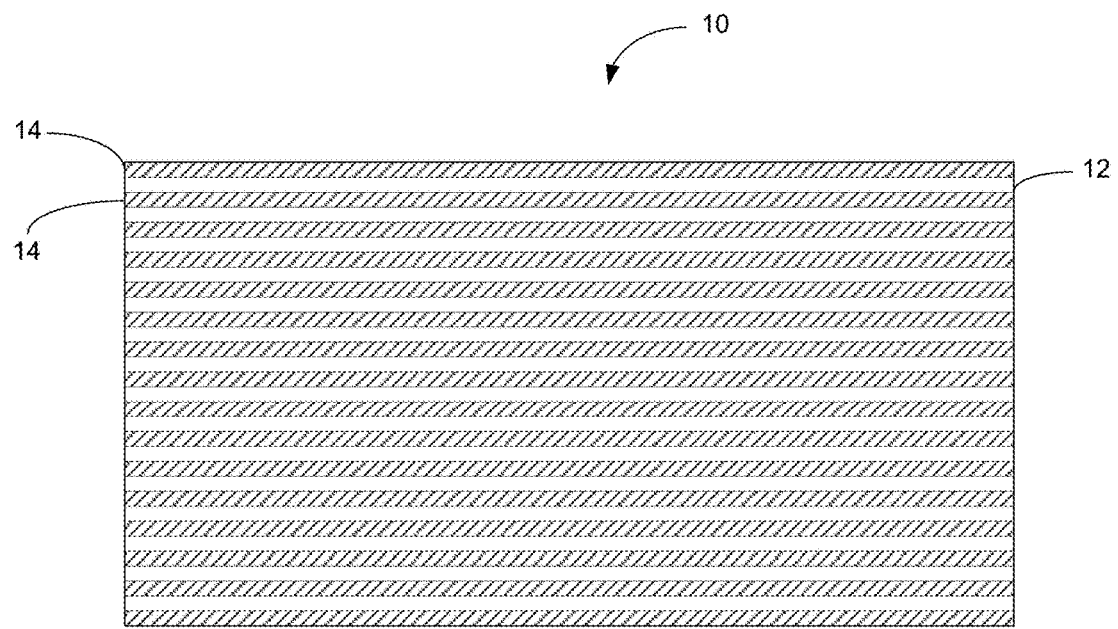
FIG. 1 illustrates a schematic view of a multilayer film in accordance with an aspect of the application.
Figure 2:
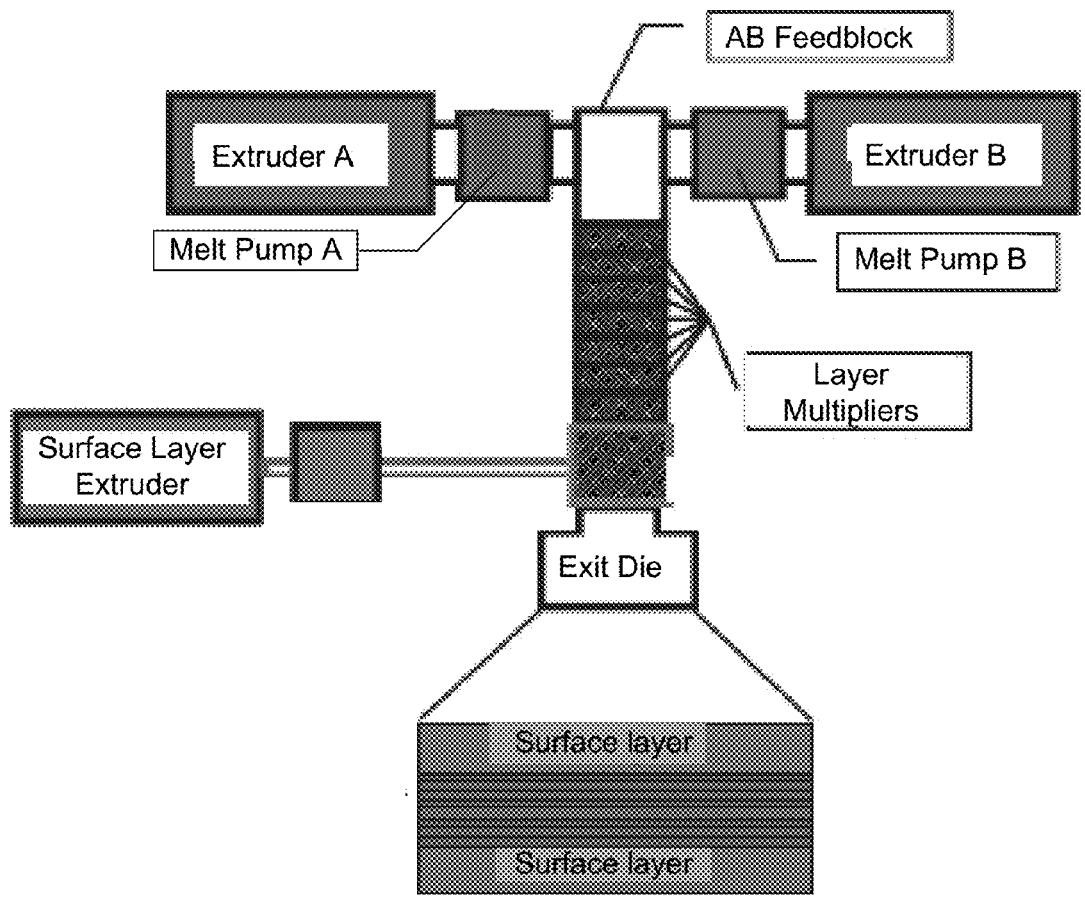
FIG. 2 is a schematic illustration of a layer-multiplying coextrusion process for forced-assembly of polymer nanolayers in accordance with an aspect of the application.

Embodiments described herein relate to membranes, such as gas separation membranes, and, in particular, relate to thin, coextruded, multilayer membranes with high flux (e.g., a flux of at least about 20 GPU) and high $CO_2/O_2$ selectivity (e.g., a $CO_2/O_2$ selectivity of at least about 4). The membrane can include an axially oriented, coextruded multilayer film that has a $CO_2/O_2$ selectivity of at least about 4 and a flux of at least about 20 GPU. The axially oriented, coextruded multilayer film can include at least one axially oriented, coextruded first polymer selective layer of a first polymer material and at least one axially oriented, coextruded second polymer support layer of a second polymer material. The at least one axially oriented, coextruded first polymer layer can have a first gas permeability ($P_1$) prior to axial orientation and a second gas permeability ($P_2$) less than or equal to the first gas permeability ($P_1$) after axial orientation. The at least one axial oriented, coextruded second polymer layer can have a first gas permeability ($P_{1a}$) prior to axial orientation and a second gas permeability ($P_{2a}$) after axial orientation that is substantially greater than first permeability ($P_{1a}$) and the second permeability ($P_2$). In some embodiments, the axially oriented, coextruded multilayer film can include a plurality of axially oriented, coextruded alternating first polymer layers and second polymer layers.

The at least one axially oriented, coextruded second support layer can be sufficiently porous and/or permeable such that the flux and selectivity of the at least one axially oriented, coextruded first polymer selective layer defines the flux and selectivity of the axially oriented, coextruded multilayer film. The at least one axially oriented, coextruded first polymer layer can have a flux of, for example, at least about 10 gas permeation units (GPU), at least about 20 GPU, or at least about 30 GPU, and the axially oriented, coextruded multilayer film can have a flux of at least about 10 GPU, at least about 20 GPU, and at least about 30 GPU. The at least one axially oriented, coextruded first polymer layer can have a $CO_2/O_2$ selectivity of, for example, at least about 4, at least about 5, at least about 6, at least about 7, at least about 8, at least about 9, or at least about 10, and the axially oriented, coextruded multilayer film can have a selectivity of at least about 4, at least about 5, at least about 6, at least about 7, at least about 8, at least about 9, or at least about 10. By way of example, the axially oriented, coextruded multilayer film can have a flux of at least about 10 GPU, at least about 20 GPU, or at least about 30 GPU and a $CO_2/O_2$ selectivity of at least about 4, for example, about 6 to about 10.

The axially oriented, coextruded multilayer film can be formed in a two step process. In the first step, a first polymer material and a second polymer material are coextruded to form at least one first polymer layer and at least one second polymer layer of the first and second polymer materials, respectively. In the second step, the multilayer film is axially oriented or stretched in at least one direction to provide an axially oriented, coextruded multilayer film that has a $CO_2/O_2$ selectivity of at least about 4 and a flux of at least about 20 GPU. The at least one axially oriented, coextruded first polymer layer can have a first permeability ($P_1$) prior to axial orientation and a second permeability ($P_2$) after axial orientation less than or equal to the first permeability ($P_1$). The at least one axially oriented, coextruded second polymer layer can have a first permeability ($P_{1a}$) prior to axial orientation and a second permeability ($P_{2a}$) after axial orientation that is substantially greater than first permeability ($P_{1a}$) and the second permeability ($P_2$). The method of forming the axially oriented, coextruded multilayer film can be a solventless and/or substantially solventless or solvent free process, i.e., the multilayer film is formed and processed substantially free of solvents or in some applications entirely without the use of solvents.

FIG. 1 is a schematic illustration of an axially oriented, coextruded multilayer film 10 in accordance with an embodiment described herein. The axially oriented, coextruded multilayer film 10 comprises alternating axially oriented, coextruded first polymer selective layers 12 and second polymer support layers 14. Although multiple first polymer selective layers 12 and multiple second polymer support layers 14 are illustrated, it will be appreciated that the axially oriented, coextruded multilayer film 10 may only include one first polymer selective layer and/or only one second polymer support layer.

In some embodiments, e.g., produce packaging, the axially oriented, coextruded multilayer film 10 can have a high $CO_2/O_2$ selectivity, a high gas flux through the film, and structural stability. In some embodiments, the axially oriented, coextruded multilayer film can have a $CO_2/O_2$ selectivity of at least about 4, for example, about 6 to about 10 and a gas flux of at least about 20 GPU, for example, at least about 30 GPU.

The first polymer selective layers 12 and second polymer support layers 14 can be made of or formed from materials that upon coextrusion and axial orientation provide the axially oriented, coextruded multilayer film with such a high $CO_2/O_2$ selectivity (e.g., at least about 4) and a high flux (e.g., at least about 20 GPU) as well as low temperature flexibility, low water sensitivity, and/or chemical resistance.

The first polymer selective layer can be formed from a first polymer material that can be readily coextruded with a second polymer material, axially oriented, e.g., uniaxially or biaxially stretched or drawn, and when coextruded and axially oriented form a layer or plurality of layers that has a high $CO_2/O_2$ selectivity (e.g., at least about 4) and a high flux (e.g., at least about 20 GPU). The first polymer material used to form the first polymer layers 12 can, for example, include any thermoplastic or thermoformable polymer material that can be readily coextruded and axially oriented, e.g., uniaxially or biaxially stretched or drawn and when coextruded and axially oriented form a layer or plurality of layers that has a high $CO_2/O_2$ selectivity (e.g., at least about 4) and a high flux (e.g., at least about 20 GPU).

Examples of polymers that can be used as the first polymer material are thermoplastic elastomers, such as polyethylene, polyethylene oxide (PEO), polycaprolactone (PCL), polyether based materials, such as polytetramethylene oxide (PTMO), and poly(ether block amide) (e.g., PEBAX, which is commercially available from Arkema, Inc.).

In some embodiments, the poly(ether block amide) can have the general formula:

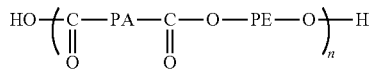

where PA is a polyamide and PE is a polyether. The composition ratio of PE/PA in the copolymer can vary from about 15/85 to about 85/15. The polyamide component can include any conventional polyamides, such as nylon 6, nylon 66, nylon 11, and nylon 12. The polyether component can be selected from polyoxyethylene, polyoxypropylene, and polytetramethylene oxide. In some embodiments, the PTMO percentage can vary from about 15% to about 80% by molecular weight. In some embodiments the PTMO percentage is at least about 60% by molecular weight. Although specific materials for the first polymer material are enumerated, it will be appreciated that alternative polymers, copolymers, and combinations thereof may be used that meet the aforementioned performance criterion, e.g., upon coextrusion and axial orientation provide an at least one first polymer layer having a $CO_2/O_2$ selectivity of at least 4 and a flux of at least about 20 for the multilayer film 10.

The second polymer support layers 14 can be formed of a second polymer material that upon coextrusion and axial orientation with the first polymer material forms microporous second polymer support layers that that have a permeability and flux substantially greater than the first polymer selective layers (e.g., at least about 2 times greater, at least about 4 times greater, at least about 5 times greater, or at least about 10 times greater) and that can be essentially non-selective to or negligible to the skeleton of the flow of $CO_2/O_2$ through the second polymer support layers. The second polymer material used to form the second polymer layers can include thermoplastic or thermoformable polymers that are immiscible or partially miscible with the first polymer material upon coextrusion. To this end, the second polymer material can include any thermoplastic or thermoformable polymer material with a viscosity that is substantially similar to the viscosity of the first polymer material. Furthermore, the first polymer material and second polymer material may be selected to have substantially similar melting temperatures ($T_m$). The second polymer material may also constitute any crystalline or glassy polymer. Moreover, the first polymer material and the second polymer material may be selected to have the same, substantially the same, or different gas permeabilities.

Examples of polymers that can be used as the second polymer material include, but are not limited to: polyolefins, polyacetals (or polyoxymethylenes), polyamides, polyesters, polysulfides, polyvinyl alcohols, polyvinyl esters, and polyvinylidenes. Polyolefins include, but are not limited to: polyethylene (including, for example, LDPE, LLDPE, HDPE, UHDPE), polypropylene, polybutylene, polymethylpentane, co-polymers thereof, and blends thereof. Polyamides (nylons) include, but are not limited to: polyamide 6, polyamide 66, Nylon 10,10, polyphthalamide (PPA), co-polymers thereof, and blends thereof. Polyesters include, but are not limited to: polyester terephalthalate, polybutyl terephalthalate, co-polymers thereof, and blends thereof. Polysulfides include, but are not limited to, polyphenyl sulfide, co-polymers thereof, and blends thereof. Polyvinyl alcohols include, but are not limited to: ethylene-vinyl alcohol, co-polymers thereof, and blends thereof. Polyvinyl esters include, but are not limited to, polyvinyl acetate, ethylene vinyl acetate, co-polymers thereof, and blends thereof. Polyvinylidenes include, but are not limited to: fluorinated polyvinylidenes (e.g., polyvinylidene chloride, polyvinylidene fluoride), co-polymers thereof, and blends thereof. Although specific materials for the second polymer material are enumerated, it will be appreciated that alternative polymers, copolymers, and combinations thereof may be used that meet the aforementioned performance criterion for the multilayer film 10.

One or more additives, such as ultraviolet blockers, coloring additives, and nucleating agents may be added to the second polymer material to form the second polymer layer 14. In one example, the additive is a filler used to impart particular properties, e.g., enhanced porosity, upon the second polymer layer 14. Examples of fillers can include, but are not limited to, calcium carbonate ($CaCO_3$), various kinds of clay, silica ($SiO_2$), alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, pulp powder, wood powder, cellulose derivatives, polymer particles, chitin, and chitin derivates, and blends thereof.

Alternatively or additionally, nucleating agents may be added to the second polymer material to increase the porosity of the second polymer layer 14 upon axially orientation. Examples of nucleating agents can include, but are not limited to, quinacridone quinone (QQ) and Millad (MD). When polypropylene is nucleated with, for example, QQ, a β-form of PP is observed. In addition to regular β-form, QQ nucleates PP into α-form. Additional instances of β-form nucleating agents and formations are disclosed in U.S. Pat. Nos. 5,134,174; 5,231,126; 5,317,035; and 5,594,070; EPO Publication No. 632,095; Japanese Kokai Nos. 7-118429 & 9-176352; Chu, F. et al., "Microvoid formation process during the plastic deformation of Beta-form polypropylene", POLYMER v34 n16, 1994; Chu, F. et al., "Crystal transformation and micropore formation during uniaxial drawing of Beta-form polypropylene film", POLYMER v36 n13, 1995; Ikeda, N. et al., "NJ-Star NU-100: A Novel Beta-Nucleator for Polypropylene", Polypropylene & World Congress, Sep. 18-20, 1996; Zhu, W. et al., "A New Polypropylene Microporous Film", Polymers for Advanced Technologies, v7, 1996, each of which is incorporated herein by reference. In one instance, the first polymer material constitutes PEBAX and the second polymer material constitutes polypropylene with one of QQ or $CaCO_3$.

The axially oriented, coextruded multilayer film can have a thickness of about 1 μm to about 2500 μm. The thickness of the axially oriented coextruded first polymer selective layers 12 axially oriented, can vary and be, for example, from about 5 nm to about 1000 nm, from about 10 nm to about 100 nm, or from about 10 nm to about 20 nm. The thickness of the axially oriented, coextruded second polymer support layer can be about 5 nm to about 10 μm, for example about 50 nm to about 1 μm. In some embodiments, the thickness(es) of the axially oriented, coextruded first polymer selective layers can be such that the total thickness or the combined thicknesses of all the first polymer selective layers in the axially oriented, coextruded multilayer film is less than about 1 μm. Advantageously, limiting the total thickness or the combined thicknesses of the at least one first polymer selective layer in the axially oriented, coextruded multilayer film to less than 1 μm can provide the multilayer film with a high flux (e.g., at least about 20 GPU or at least about 30 GPU) that is suitable for packaging applications. It will be appreciated that the thicknesses of the axially oriented, coextruded first polymer selective layers 12 and the second polymer support layers 14 can be readily selected to optimize reduction of the thicknesses first polymer layers 12 without causing structural defects in the first polymer layers 12 or the axially oriented multilayer film.

The axially oriented, coextruded multilayer film 10 can be prepared by initially coextruding the first polymer material and the second polymer material to form the two polymer layers 12, 14. Coextrusion of the first polymer material and the second polymer material can yield a large, flexible film 10 or sheet of multilayer structure including alternating first polymer layers 12 and second polymer layers 14. Alternatively, a coextruded multilayer film 10 may be formed that includes only one first polymer layer 12 and/or only one second polymer layer 14 (not shown).

Figure 3:
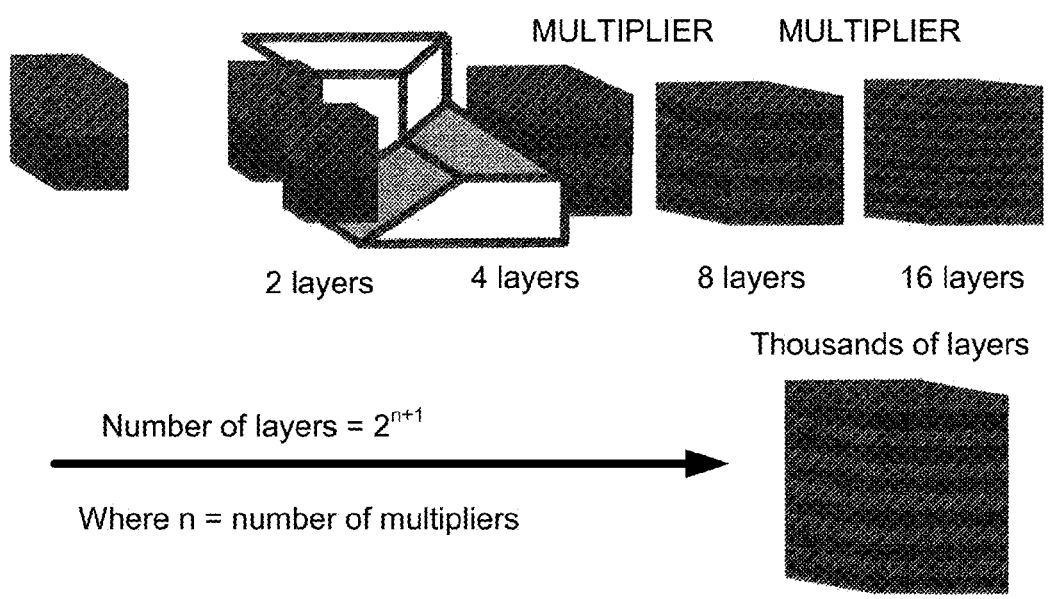
FIG. 3 is a schematic illustration of a layer-multiplying coextrusion die for forced-assembly of polymer nanolayers in accordance with another aspect of the application.
Figure 4:
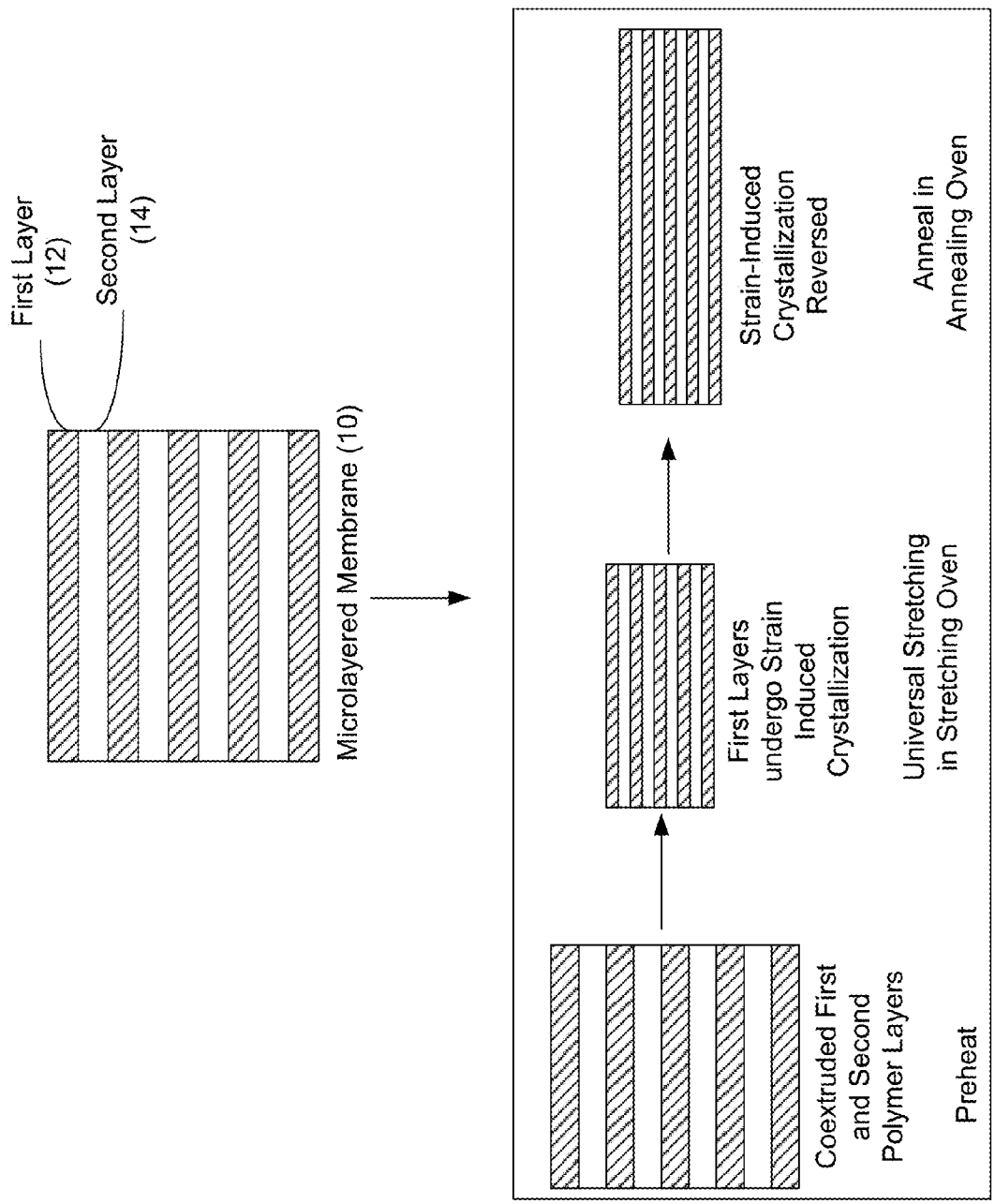
FIG. 4 is a schematic illustration of a method of forming an axially oxiented multilayer film that is subsequently heat treated.

A typical multilayer coextrusion apparatus is illustrated in FIGS. 3 and 4. The two component, e.g., first polymer material (a) and second polymer material (b), coextrusion system consists of two ¾ inch single screw extruders each connected by a melt pump to a coextrusion feedblock. The feedblock for this two component system combines first polymeric material (a) and second polymeric material (b) in an (AB) layer configuration. The melt pumps control the two melt streams that are combined in the feedblock as two parallel layers. By adjusting the melt pump speed, the relative layer thickness, e.g., the thickness ratio of A to B, can be varied. From the feedblock, the melt goes through a series of multiplying elements. A multiplying element first slices the AB structure vertically, and subsequently spreads the melt horizontally. The flowing streams recombine, doubling the number of layers. An assembly of n multiplier elements produces an extrudate with the layer sequence $(AB)^x$ where x is equal to $(2)^n$ and n is the number of multiplying elements. It is understood by those skilled in the art that the number of extruders used to fabricate the structure of the invention equals the number of components. Thus, a three-component multilayer (ABC . . . ), requires three extruders.

In some embodiments, the coextruded multilayer film 10 can have at least 3 alternating layers, but may have more or fewer layers. In one example, the multilayer film 10 of the present invention has 3 layers. By altering the relative flow rates or the number of layers 12, 14, while keeping the film or sheet thickness constant, the individual layer thickness can be controlled. The coextruded multilayer film 10 or sheet can have an overall thickness ranging, for example, from about 1 μm to about 25,000 μm, and any increments therein.

In some aspects, the layers 12, 14 can be coextruded at a temperature that is above the melting temperature ($T_m$) of the first polymer material and optionally also above the melting temperature ($T_m$) of the second polymer material. The coextrusion temperature may be chosen such that the viscosities of the first and second polymer materials used to form the first and second polymer layers 12, 14 are as close as possible to one another to promote uniformly coextruded layers. The coextrusion can be performed to render the first and second polymer layers 12, 14 as thin as possible without inducing tensile failure or otherwise structurally compromising the first polymer layers 12. Coextruding the multilayer film 10 causes the first polymer layers 12 to exhibit a first gas permeability and the second polymer layers 14 to exhibit a second gas permeability. The first and second gas permeabilities may be the same, substantially the same, or different.

After coextrusion, the coextruded multilayer film 10 is axially oriented or stretched at a temperature below the melting temperatures ($T_m$) of the first polymer material or layer 12 and the second polymer material or layer 14. Axial orientation should be sufficient to reduce the total thickness of the first polymer layer 12 or the combined thicknesses of the first polymer layers to less than about 1 μm in order to potentially improve the flux of the first polymer layers without affecting or while maintaining the $CO_2/O_2$ selectivity of the axially oriented, coextruded multilayer film. Axial orientation of the first polymer layers 12 below the melting temperatures ($T_m$) of the first polymer layer 12 can result in strain-induced crystallization, e.g., substantially crystalline lamellae, within the microstructure of the first polymer material (a) of the first polymer layers 12 that can reduce the permeability of the first polymer selective layers from a first permeability to a second lower permeability. In certain embodiments, axial orientation of the coextruded multilayer film can result in or cause each first polymer layer 12 to crystallize as a high aspect ratio substantially crystalline lamellae, which has a reduced permeability.

In contrast, axial orientation of the multilayer film below the melting temperature ($T_m$) of the second polymer layers 14 can make the second polymer layers more porous or more permeable such that the second polymer support layers have a substantially greater (e.g., at least about 5 times greater) gas permeability and flux than the first polymer selective layers. In certain embodiments, axially orienting the coextruded multilayer film 10 decreases the density of the second polymer material (b) of the second polymer layers 14. When β-nucleating additives are present in the second polymer layer 14, axial orientation of the second polymer material (b) induce α-phase crystallinity in the second polymer layer 14, which introduces voids in the second polymer layer 14, thereby increasing porosity and permeability through the second polymer layer 14.

Axial orientation of the multilayer film 10 may be uniaxial or biaxial and may be undertaken at a temperature of from about 23° C. to about 120° C., for example, from about 70° C. and about 100° C., depending on the melting temperatures ($T_m$) of the first polymer material and the second polymer material 14. If the multilayer film 10 is biaxially oriented, the draw rate may be symmetric or asymmetric. The coextruded multilayer film 10 may, for instance, be drawn at strain rates of, for example, about 50%/min or about 100%/sec to an axially oriented length of about 100% to about 400%. The drawing may be constrained or unconstained. In one example, the multilayer film can be simultaneously biaxially drawn to draw ratios varying from about 1.8:1.8 to about 5:5 at a temperature of between 90° C.-110° C. and a strain rate of about 20-500%/s, although other draw ratios may be used.

Axially orienting the multilayer film 10 increases the gas permeability of the second polymer layers 14 above the second gas permeability of the axially oriented first polymer layers 12 such that the lower gas permeability of the first polymer layers 12 dictates the gas permeability, selectivity, and flux of the axially oriented, coextruded multilayer film 10. In other words, axially orienting the multilayer film 10 alters the multilayer film 10 from an unoriented condition in which the first and second polymer layers 12, 14 have a first gas permeability relationship, e.g., the same or different gas permeabilities, to an axially oriented condition having a second gas permeability relationship in which the second polymer layers 14 have a substantially greater gas permeability than the first polymer layers 12. In certain embodiments, axially orienting the multilayer film 10 results in a thin, multilayer film that exhibits a $CO_2/O_2$ selectivity of about 6 to about 10, high gas permeability, and a flux of about 30 GPU.

FIG. 4 illustrates a method of preparing the multilayer film 10 when axial orientation of the coextruded multilayer film 10 produces strain-induced crystallization in the first polymer layers 12. When the coextruded multilayer film 10 is axially oriented in this manner, the strain on the first polymer material (a) of the first polymer layers 12 induces crystallization along and within the first polymer layers 12. The crystallization results in the formation of lamellae within the first polymer layers 12 that extend parallel to the plane of the first polymer layers 12. The lamellae therefore extend in a direction that is perpendicular or transverse to the gas flow direction through the multilayer film 10. Accordingly, strain-induced crystallization in the first polymer layers 12 reduces the gas permeability of the axially oriented, coextruded first polymer layers 12 and, thus, the gas permeability of the axially oriented, coextruded multilayer film 10 is reduced. Although the multilayer film 10 may regain some permeability upon elastic relaxation and recovery of the film following axial orientation, residual strain-induced crystallinity within the first polymer layers 12 ultimately results in an overall reduced gas permeability. In some instances, strain-induced crystallization may cause up to about a 3.5× reduction in permeability of the first polymer layers 12 relative to the permeability of unoriented first polymer layers 12.

Since it is desirable to maintain high gas permeability in certain applications, e.g., produce packaging, it is beneficial to remove or reverse the effects of strain-induced crystallization in the axially oriented, coextruded first polymer layers 12. Removing or reversing the effects of strain-induced crystallization in the first polymer layers 12 can result in restoring high gas permeability to the first polymer layers 12 and, thus, restoring high gas permeability and flux in the multilayer film 10. In some embodiments, the effects of strain-induced crystallization in the axially oriented first polymer layers 12 can be removed and/or restored by heat treating and/or annealing the axial oriented multilayer film at temperature and for a time effective to remove at least some of the strain-induced crystallization in the first polymer layers 12 without decreasing the selectivity of the first polymer layers.

The heat treating or annealing can be conducted at a temperature that is higher than the melting of the strain-induced crystallinity, e.g., at 42° C. for PEBAX. Annealing the multilayer film 10 causes the elongated lamellae in the first polymer layers 12 to relax along their length, thereby increasing the permeability of the first polymer layers 12 and, thus, increasing the permeability of the multilayer film 10. The permeability of the first polymer layers 12 may increase to a level that is substantially equal to or above the permeability of the first polymer layers 12 prior to axial orientation to provide the desired gas permeability, selectivity, and flux for a particular application. In other words, annealing substantially restores the gas permeability of the multilayer film 10.

In some embodiments, the coextruded multilayer film can be heat treated or annealed prior to axial orientation to substantially increase gas flux (e.g., at least about 50% to about 100%) of the axially oriented, coextruded multilayer film. It was found that annealing a coextruded multilayer film comprising a first selective layer of PEBAX and a second support layer of nucleated polypropylene at temperature of about 140° C. for thirty minutes prior to orientation improved the gas flux of the axially oriented, coextruded multilayer film about 50% to about 100% compared to similar axially oriented, coextruded multilayer films that were not annealed prior to axial orientation. This results from improved β-polypropylene crystallinity that leads to more and larger pores in the polypropylene when the multilayer film is axially oriented.

Once the multilayer film 10 is coextruded, axially oriented, and—if applicable—annealed, the film 10 may be formed into a number of articles by, for example, thermoforming, vacuum forming, or pressure forming. Further, through the use of forming dies, the multilayer films 10 may be formed into a variety of useful shapes including profiles, tubes, and the like. Since the coextruded, axially oriented, multilayer film 10 achieves a thin, highly selective construction while being manufactured in a solventless process, the coextruded, multilayer film 10 of the present invention is advantageous over prior multilayer films.

The following examples are for the purpose of illustration only and are not intended to limit the scope of the claims, which are appended hereto.

Example 1

Figure 5:
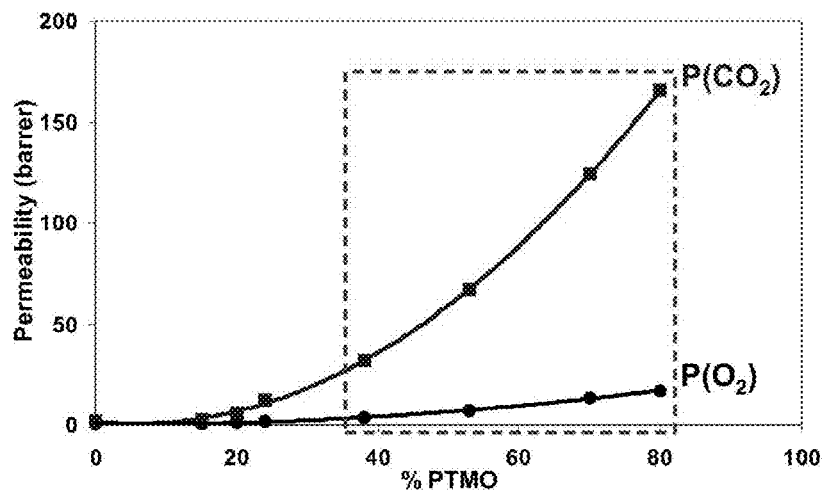
FIG. 5 is a graph illustrating gas permeability relative to PTMO content in PEBAX film layers.

In the present example, polymer film layers formed from PEBAX® grades having various composition ratios (vol/ vol) including PTMO/PA-12 80/20, 70/30, 53/47, 38/62, 25/75, 20/80, and 15/85 were tested for gas permeability before the layers were axially oriented. FIG. 5 and Table 1 illustrate that the addition of PTMO significantly increases the permeability of the polymer film layer as compared to Nylon-12. Furthermore, it is clear that the selectivity remains constant at about 9 in the PEBAX grades having high PTMO content.

TABLE 1

| | PEBAX grade | | | | | | | |
|---|---|---|---|---|---|---|---|---|
| | 2533 | 3533 | 4033 | 5533 | 6333 | 7033 | 7233 | Nylon-12 |
| % PTMO | 80 | 70 | 53 | 38 | 25 | 20 | 15 | 0 |
| $P(CO_2)/P(O_2)$ | 9.8 | 9.3 | 9.32 | 9.2 | 7.9 | 6.2 | 4.8 | 4.2 |

Figure 6:
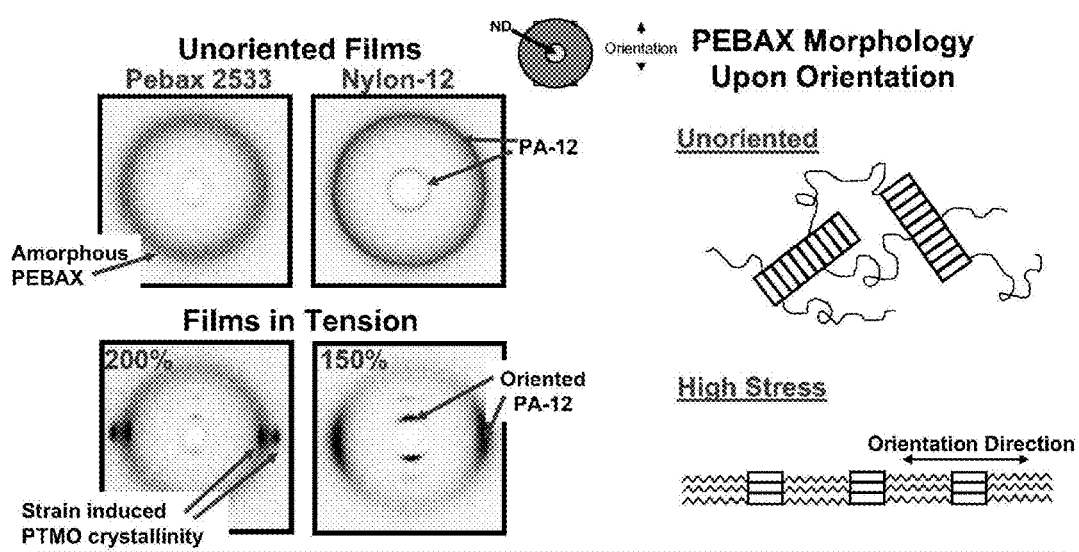
FIG. 6 illustrates images of unoriented and axially oriented PEBAX film layers.
Figure 7:
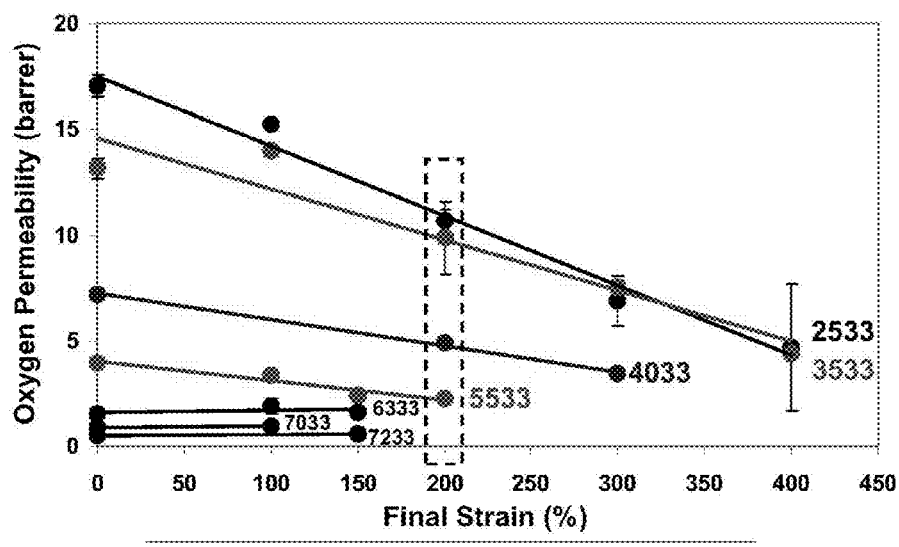
FIG. 7 is a graph illustrating oxygen permeability of axially oriented PEBAX film layers

Referring to FIG. 6, the polymer film layers were uniaxially stretched, thereby producing strong alignment and strain-induced crystallization of the PTMO blocks. Confirmation of the oriented lamellar morphology of the polymer film layers and details of the global orientation were obtained with wide angle X-ray scattering (WAXS). FIG. 7 and Table 2 illustrate that axially orientating the polymer films containing PEBAX decreases the oxygen permeability of the polymer film. In particular, it is clear that PEBAX grades containing at least 40% PTMO had up to a 3.5× decrease in $O_2$ permeability with increasing strains. The $CO_2/O_2$ selectivity of the same PEBAX gradient, however, stayed substantially the same.

TABLE 2

| | PEBAX Grade | | | |
|---|---|---|---|---|
| | 2533 | 3533 | 4033 | 5533 |
| % PTMO | 80 | 70 | 53 | 38 |
| $P(O_2)$ decrease | 3.5x | 3.0x | 2.1x | 1.8x |

Figure 8:
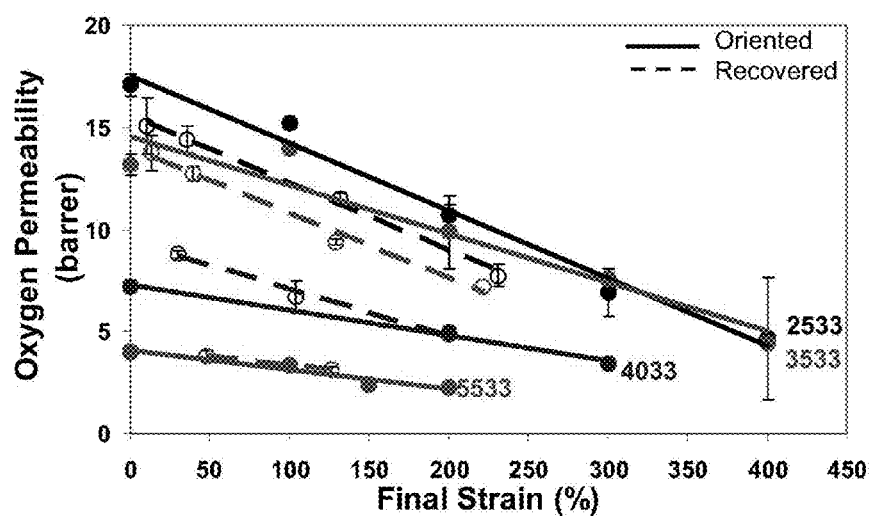
FIG. 8 is a graph illustrating oxygen permeability of elastically recovered PEBAX film layers.

The strain-induced crystallization leads to reduced permeability of the polymer film layers upon orientation. In particular, the WAXS images show two equatorial reflections from orientation and strain-induced crystallization of the PTMO blocks. Once the layers were allowed to elastically recover at room temperature by removing the applied stress, the oxygen permeability of each PEBAX grade was calculated as shown in FIG. 8. In particular, oxygen flux J(t) at 0% relative humidity, 1 atm, and 23° C. was measured with a MOCON OX-TRAN 2/20. The permeant gas stream was diluted with nitrogen to achieve a 2% oxygen concentration in order to avoid exceeding the detector capability of the instrument. Permeability was obtained from the steady flux $J_0$ according to:

$$P = J_0 l/p$$

where p is the oxygen pressure and l is the film thickness. Two films prepared under the same conditions were tested to obtain the average permeability. The permeability can be split into the solubility (S) and diffusivity (D). Usually S and D are extracted from the non-steady state flux curve.

The strain-induced crystallization caused reduced permeability (up to about 3.5× in some cases) in oriented PEBAX films relative to the permeability of the original, unoriented PEBAX films. PEBAX grades with more PTMO showed a greater effect of strain-induced crystallinity. WAXS images illustrating the residual crystallinity in the PEBAX layers are shown in FIG. 6.

Figure 9:
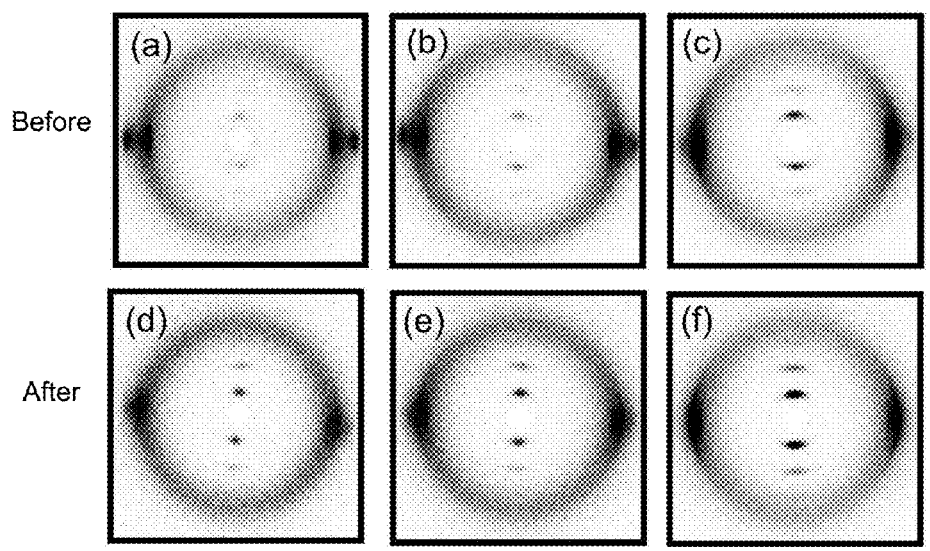
FIG. 9 is a graph illustrating oxygen permeability of annealed PEBAX film layers.
Figure 10:
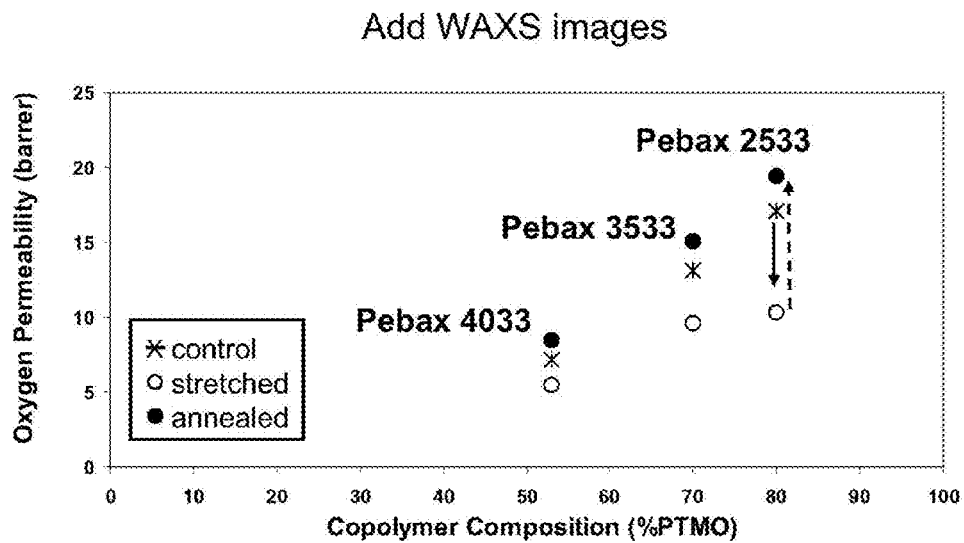
FIG. 10 illustrates WAXS images of PEBAX film layers before and after annealing.

In order to reverse the reduced permeability caused by the strain-induced crystallization, the axially oriented polmyer film layers were annealed. More specifically, the polymer film layers were heat treated at 60° C. for 30 minutes in order to reverse the strain-induced crystallization. WAXS patterns of the polymer film layers prior to and following annealing are shown in FIG. 10. Using commercial instruments from MOCON (D. J. Sekelik, E. V. Stepanov, S. Nazarenko, D. Schiraldi, A. Hiltner, E. Baer, J. Polym. Sci. Pt. B-Polym. Phys. 37, 847-857 (1999)), the oxygen permeability was then measured on the polymer films. As shown in FIG. 9, after annealing the $O_2$ permeability of 200% strain samples of the polymer films returned to values similar to the unoriented controls.

Example 2

Figure 11:
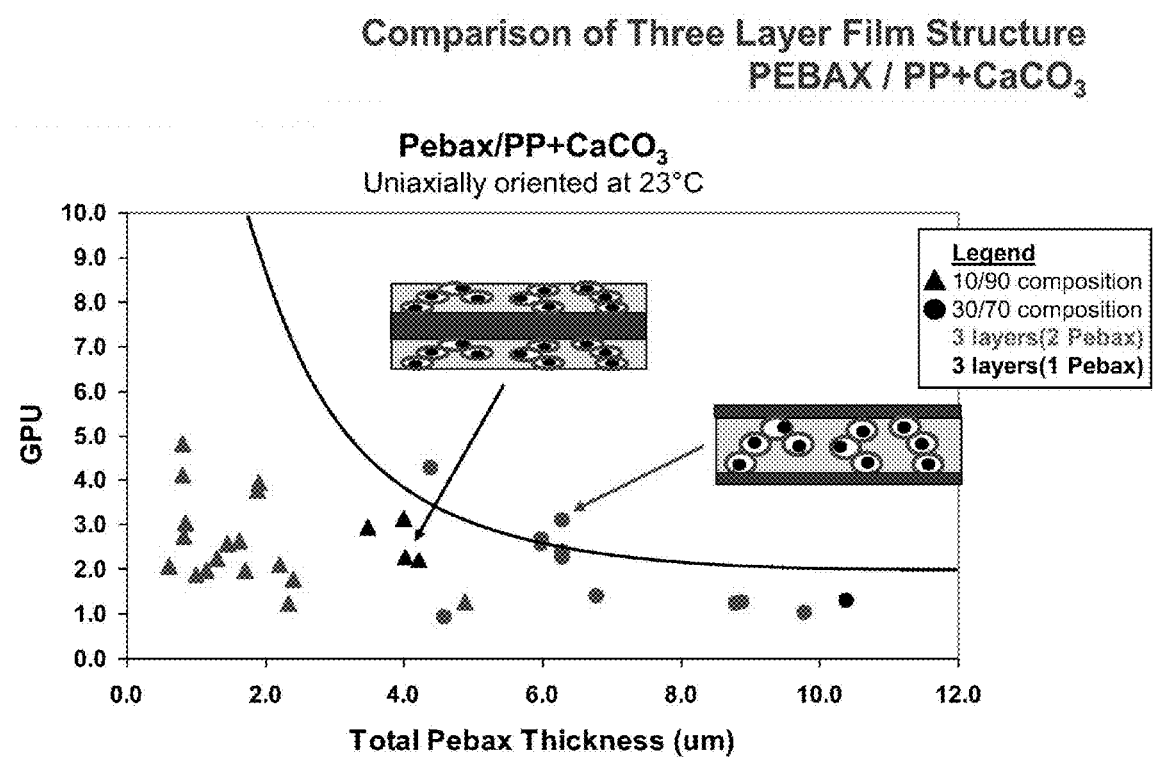
FIG. 11 is a graph illustrating oxygen flux of uniaxially oriented PEBAX/PP+$CO_3$ multilayered films.
Figure 12:
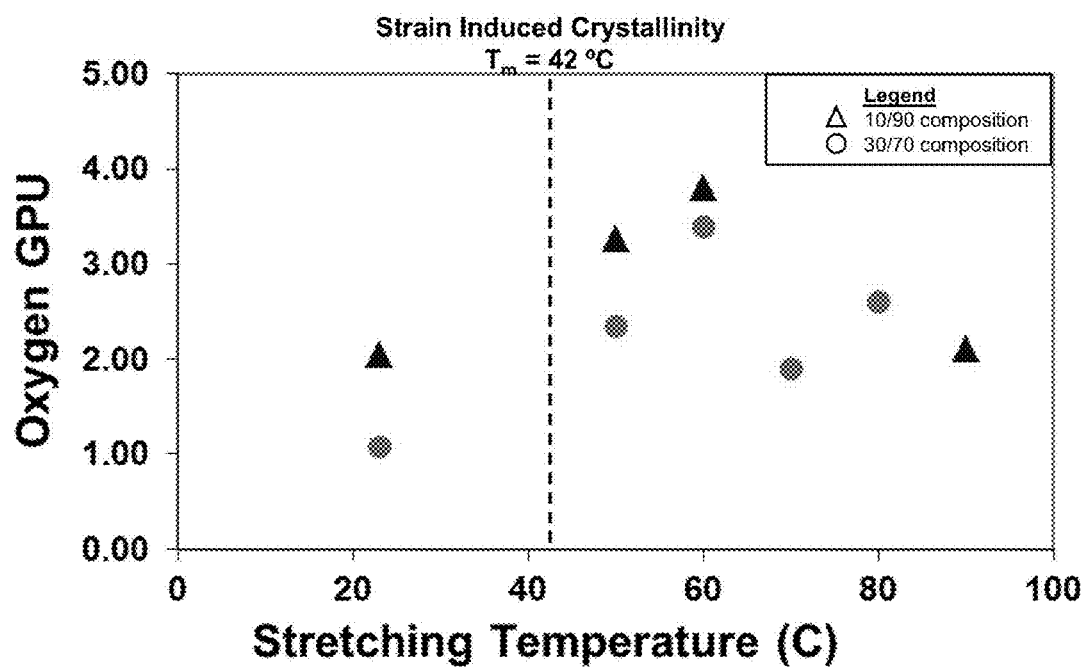
FIG. 12 is a graph illustrating the effect of temperature on axially orienting PEBAX/PP+$CO_3$ multilayered films.
Figure 13:
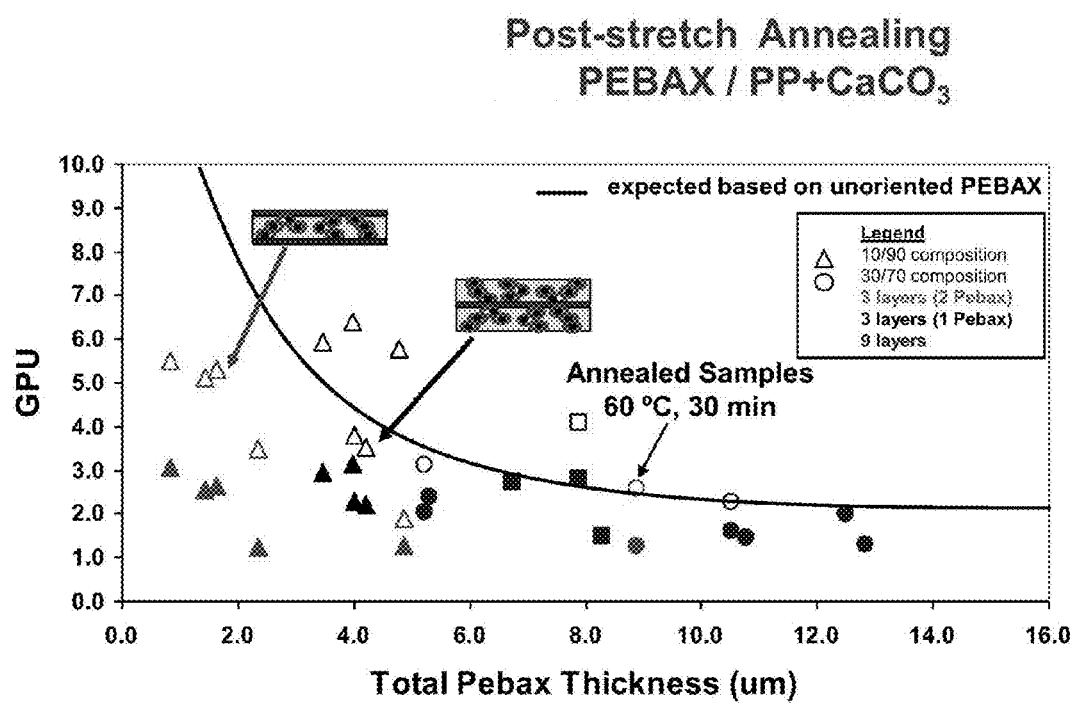
FIG. 13 is a graph illustrating oxygen flux of annealed PEBAX/PP+$CO_3$ multilayered films.

In this example shown in FIGS. 11-13, multilayer films included three alternating layers of PEBAX and $PP+CO_3$. In one instance, the multilayer film included two PEBAX layers and one layer of $PP+CO_3$. In another instance, the multilayer film included one PEBAX layer and two layers of $PP+CO_3$. The co-extruded films had PEBAX/($PP+CaCO_3$) volume compositions of 10/90 or 30/70. The multilayer films were coextruded, uniaxially oriented at 23° C., 50%/min to 250%. Oxygen flux of the uniaxially oriented films is illustrated in FIG. 11 with FIG. 12 illustrating the effect temperature has on axial orientation of the multilayer films. FIG. 12 makes clear that stretching or axially orienting the multilayer films increases gas flux when conducted above the melting temperature in which strain-induced crystallinity is induced, e.g., $T_m$=42° C. At 60° C., however, it appears that gas flux through the multilayer films decreases due to reduced pore formation and the collapse of pores in the PP layers. That being said, the membranes appeared to have similar permeation values and trends regardless of the film structure, e.g., PEBAX layers on the outside or inside of the multilayer film.

Referring to FIG. 13, after annealing, the oxygen flux of all samples roughly doubled by reducing or eliminating strain-induced crystallization within the PEBAX layers. The PEBAX thickness did not appear to affect the amount of flux increase.

Example 3

Figure 14:
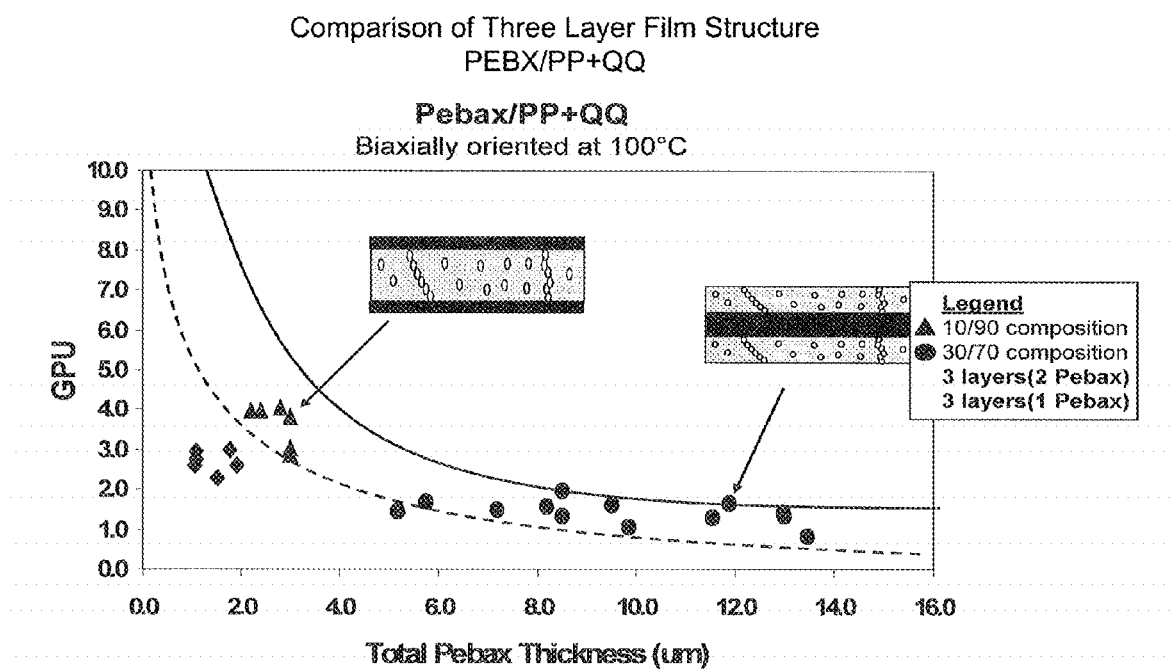
FIG. 14 is a graph illustrating oxygen flux of biaxially oriented PEBAX/PP+QQ multilayered films.
Figure 15:
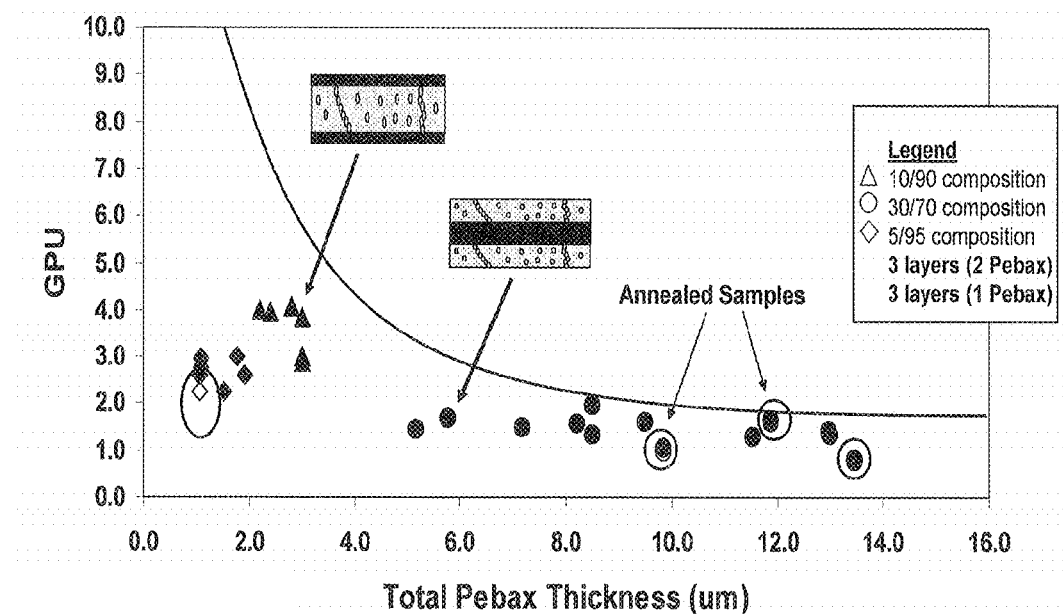
FIG. 15 is a graph illustrating oxygen flux of annealed PEBAX/PP+QQ multilayered films.

In this example shown in FIGS. 14-15, multilayer films included three alternating layers of PEBAX and PP+QQ. In one instance, the multilayer film included two PEBAX layers and one layer of PP+QQ. In another instance, the multilayer film included one PEBAX layer and two layers of PP+QQ. The multilayer films had PEBAX/(PP+QQ) volume compositions of 10/90 and 30/70. The multilayer films were coextruded, biaxially oriented at 100° C., 100%/min, and 2×2. Oxygen flux of the biaxially oriented films is illustrated in FIG. 14. The membranes appeared to have similar permeation values and trends regardless of the film structure. After annealing, the oxygen flux of all samples remained roughly constant (FIG. 15). The PEBAX thickness and film structure did not appear to affect the annealing results.

Example 4

Figure 16:
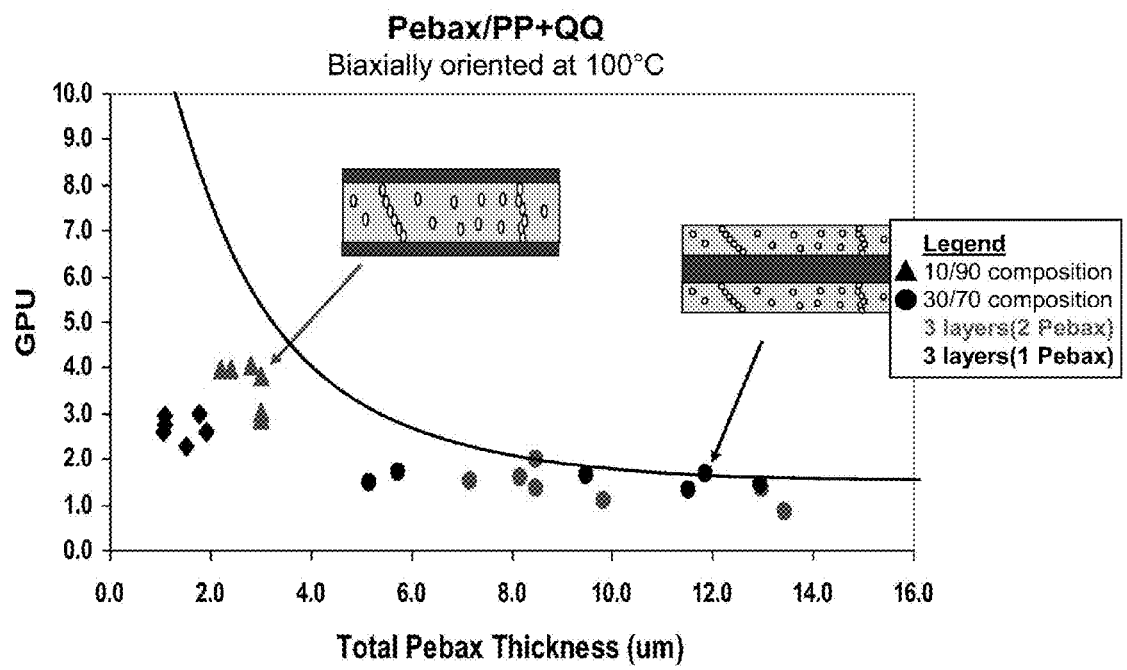
FIG. 16 is a graph illustrating oxygen flux of biaxially oriented PEBAX/β-PP multilayered films.
Figure 17:
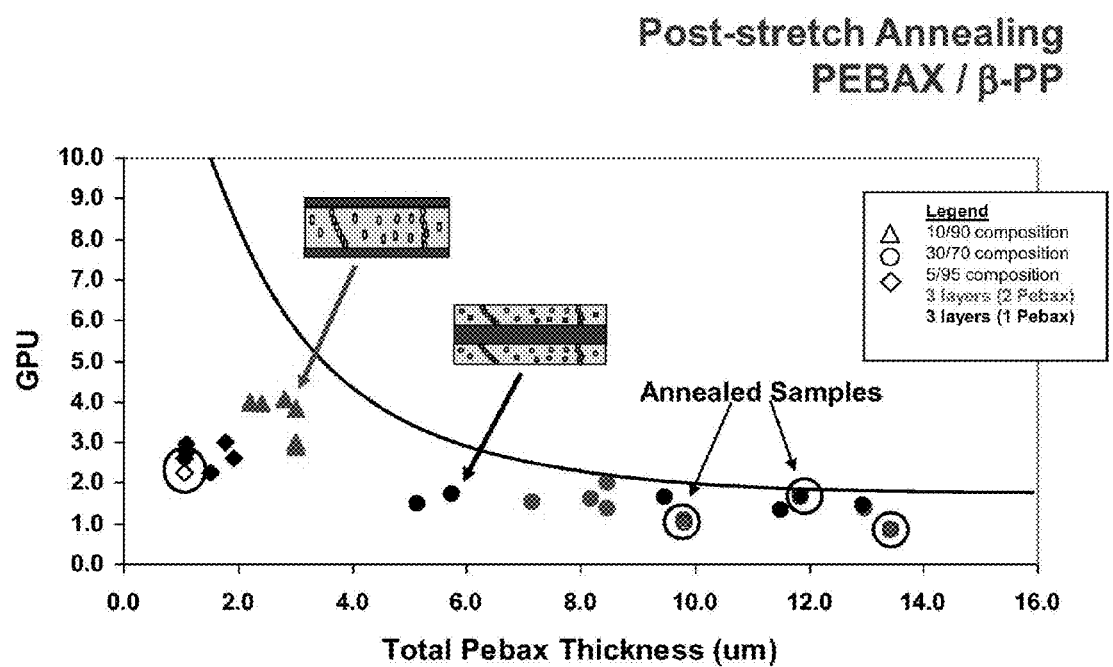
FIG. 17 is a graph illustrating oxygen flux of annealed PEBAX/β-PP multilayered films following biaxial orientation.
Figure 18:
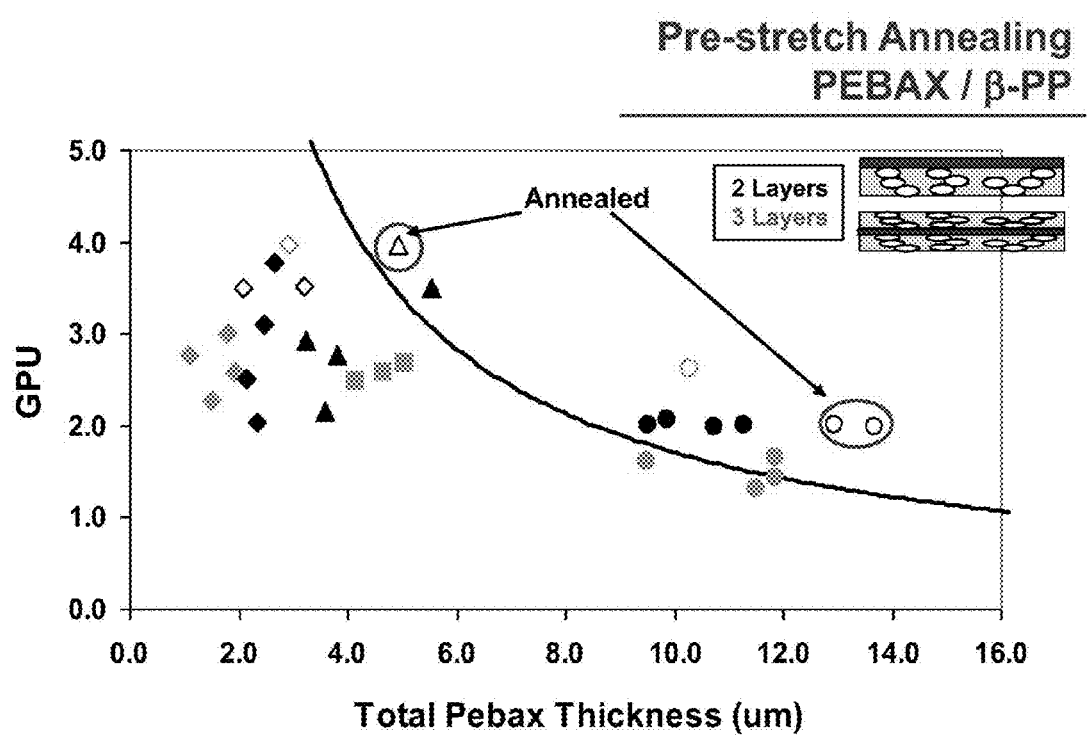
FIG. 18 is a graph illustrating oxygen flux of annealed PEBAX/β-PP multilayered films prior to biaxial orientation.

In this example shown in FIGS. 16-18, multilayer films included three alternating layers of PEBAX and β-PP. In one instance, the multilayer film included two PEBAX layers and one layer of β-PP. In another instance, the multilayer film included one PEBAX layer and two layers of β-PP. The multilayer films had PEBAX/β-PP volume compositions of 10/90 and 30/70. The multilayer films were coextruded, biaxially oriented at 100° C., and annealed. Oxygen flux of the biaxially oriented films prior to annealing is illustrated in FIG. 16. The membranes appeared to have similar permeation values and trends regardless of the film structure.

Table 3 illustrates that the multilayer films showed much lower permeability when uniaxially stretched compared to biaxial stretching. The 10/90, three layer films having a 4 mils thickness were stretched uniaxially to 200% strain at various temperatures and strain rates. The test indicated that low temperatures and high strain rates produce films that appear to have higher porosity.

TABLE 3

|  | 50° C. 50%/min | 50° C. 1000%/min | 70° C. 50%/min | 70° C. 1000%/min | 100° C. 50%/min | Biaxially Oriented 100%/s |
|---|---|---|---|---|---|---|
| $P(O_2)$ | 13 | 11.9 | 5.3 | 9.8 | 1.6 | 11.9 |
| PEBAX Thickness (μm) | 5 | 4.6 | 3.6 | 4 | 3.9 | 4.6 |

Referring to FIG. 17, post-orientation annealing indicated that the oxygen flux of all samples remained roughly constant as the PEBAX layers did not appear to strain crystallize under the orientation conditions used. In contrast, pre-orientation annealing at 140° C. for 30 minutes significantly increased the oxygen flux (about 50-100%) due to the formation of more and/or larger pores in the β-PP layers (FIG. 18). The PEBAX thickness and film structure did not appear to affect the annealing results. In any case, it appears that orientation at high strain rates and under low temperatures produces desirable flux values for PEBAX/β-PP multilayer films.

While a preferred embodiment of the invention has been illustrated and described, it shall be understood that the invention is not limited to this embodiment. Numerous modifications, changes and variations will be obvious for those skilled in the art, without departing from the scope of the invention as described by the appended claims. All patents, publications, and references cited herein are incorporated by reference in their entirety.

Having described the invention, the following is claimed:

1. A food packaging membrane comprising:
an axially oriented, coextruded multilayer film that has a flux of at least about 10 GPU, the axially oriented, coextruded multilayer film including at least one axially oriented, coextruded first polymer layer of a first polymer material and at least one axially oriented, coextruded second polymer layer of a second polymer material, the at least one axially oriented, coextruded first polymer layer having a first permeability ($P_1$) prior to axial orientation and a second permeability ($P_2$) after axially orientation less than or equal to the first permeability ($P_1$), the at least one axially oriented, coextruded second polymer layer having a first permeability ($P_{1a}$) prior to axial orientation and a second permeability ($P_{2a}$) after axial orientation that is substantially greater than the first permeability ($P_{1a}$) and the second permeability ($P_2$), the axially oriented, coextruded first polymer layer having a thickness and the combined thicknesses of all the axially oriented, coextruded first polymer layers of the axially oriented, coextruded multilayer film being less than about 1 μm.

2. The food packaging membrane of claim 1, wherein the axially oriented, coextruded multilayer film having a $CO_2/O_2$ selectivity of at least about 4.

3. The food packaging membrane of claim 1, wherein the axially oriented, coextruded first polymer layers having a $CO_2/O_2$ selectivity of at least about 4.

4. The food packaging membrane of claim 1, wherein the axially oriented, coextruded multilayer film having a flux of at least about 30 GPU.

5. The food packaging membrane of claim 1, wherein the first polymer material comprises a poly(ether block amide).

6. The food packaging membrane of claim 5, wherein the first polymer material comprises poly(ether block amide) that includes from about 15% to about 80% of a polyether by molecular weight.

7. The food packaging membrane of claim 1, wherein the second material comprises polypropylene.

8. The food packaging membrane of claim 7, wherein the second polymer material further comprises $CaCO_3$ or a beta-nucleation agent.

9. The food packaging membrane of claim 1, wherein the axially oriented, coextruded multilayer film comprises a plurality of axially oriented, coextruded alternating first polymer layers and second polymer layers.

10. A method of fabricating a food packaging membrane comprising:
coextruding a first polymer material and a second polymer material to form a multilayer film that includes at least one coextruded first polymer layer and at least one coextruded second polymer layer, the at least one first polymer layer having a first permeability ($P_1$); and
axially orienting the coextruded multilayer film, the at least one axially oriented, coextruded first polymer layer having a second permeability ($P_2$) after axial orientation less than or equal to the first permeability ($P_1$), the at least one axially oriented, coextruded second polymer layer having a first permeability ($P_{1a}$) prior to axial orientation and a second permeability ($P_{2a}$) after axial orientation that is substantially greater than the first permeability ($P_{1a}$) and the second permeability ($P_2$), wherein the axially oriented, coextruded multilayer film has a flux of at least about 10 GPU, the axially oriented, coextruded first polymer layer having a thickness and the combined thicknesses of all the axially oriented, coextruded first polymer layers of the axially oriented, coextruded multilayer film being less than about 1 μm.

11. The method of claim 10, wherein the multilayer film is axially oriented at a temperature below the melting temperature ($T_m$) of the second polymer material.

12. The method of claim 10, wherein the multilayer film is uniaxially stretched.

13. The method of claim 10, wherein the at least one first polymer layer having a $CO_2/O_2$ selectivity of at least about 4 and the axially oriented, coextruded multilayer film having a $CO_2/O_2$ selectivity of at least about 4.

14. The method of claim 10, wherein the first polymer material comprises a poly(ether block amide).

15. The method of claim 14, wherein the first polymer material comprises poly(ether block amide) that includes from about 15% to about 80% of a polyether by volume.

16. The method of claim 10, wherein the second polymer material comprises polypropylene.

17. The method of claim 16, wherein the second polymer material further comprises $CaCO_3$ or a beta-nucleation agent.

18. The method of claim 10, wherein the axially oriented, coextruded multilayer film comprises a plurality of axially oriented, coextruded alternating first polymer layers and second polymer layers.

19. The method of claim 10, wherein the multilayer film is formed in a solventless process.

20. The method of claim 10, wherein the multilayer film is axially stretched from about 100% to about 400%.

21. The method of claim 10, further comprising heat treating the multilayer film at a temperature and for a time to increase the gas permeability of the at least one axially oriented, coextruded first polymer layer.

22. The method of claim 21, wherein axially orienting the at least one first polymer layer causes strain-induced crystallization in the at least one first polymer layer and the heat treating at least partially reversing crystallization in the at least one first polymer layer to increase the gas permeability of the at least one first polymer layer.

* * * * *

UNITED STATES PATENT AND TRADEMARK OFFICE
CERTIFICATE OF CORRECTION

PATENT NO. : 9,724,900 B2　　　　　　　　　　　　　　　　　　　　Page 1 of 1
APPLICATION NO. : 14/570990
DATED : August 8, 2017
INVENTOR(S) : Eric Baer et al.

It is certified that error appears in the above-identified patent and that said Letters Patent is hereby corrected as shown below:

In the Specification

Please replace the paragraph at Line 9, Column 1 with the following:
--Government Funding
This invention was made with government support under Grant No. DMR-0423914, awarded by The National Science Foundation. The United States government has certain rights in the invention.--

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*